(12) United States Patent
Liu et al.

(10) Patent No.: US 10,886,801 B2
(45) Date of Patent: Jan. 5, 2021

(54) VERNIER MACHINE WITH SHAPED PERMANENT MAGNET GROUPS

(71) Applicant: Wisconsin Alumni Research Foundation, Madison, WI (US)

(72) Inventors: Wenbo Liu, Madison, WI (US); Thomas A. Lipo, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 550 days.

(21) Appl. No.: 15/720,242

(22) Filed: Sep. 29, 2017

(65) Prior Publication Data

US 2019/0103776 A1  Apr. 4, 2019

(51) Int. Cl.
*H02K 1/27* (2006.01)
*H02K 21/16* (2006.01)

(52) U.S. Cl.
CPC .......... *H02K 1/2766* (2013.01); *H02K 21/16* (2013.01)

(58) Field of Classification Search
CPC .... H02K 1/276; H02K 1/2773; H02K 1/2706; H02K 1/2766; H02K 21/14; H02K 21/16
USPC ..................................................... 310/156.53
See application file for complete search history.

(56) References Cited

U.S. PATENT DOCUMENTS

| 6,774,523 | B2 | 8/2004 | Ahn et al. |
| 6,803,692 | B2 | 10/2004 | Hattori et al. |
| 7,518,277 | B2 | 4/2009 | Nemoto et al. |
| 8,018,109 | B2 | 9/2011 | Leonardi et al. |
| 8,368,273 | B2 | 2/2013 | Hino et al. |
| 8,508,092 | B2 | 8/2013 | Ankeney et al. |
| 8,536,748 | B2 | 9/2013 | Liang et al. |
| 8,884,485 | B2 | 11/2014 | Jurkovic et al. |
| 8,922,084 | B2 | 12/2014 | Nagai et al. |
| 9,035,522 | B2 | 5/2015 | Liang et al. |
| 9,197,105 | B2 | 11/2015 | Kogure et al. |
| 9,306,422 | B2 | 4/2016 | Berkouk et al. |
| 9,343,933 | B2 | 5/2016 | Isoda et al. |
| 9,343,937 | B2 | 5/2016 | Nakazono et al. |
| 9,369,016 | B2 | 6/2016 | Herranz Gracia et al. |

(Continued)

OTHER PUBLICATIONS

Evaluation of the 2007 Toyota Camry Hybrid Synergy Drive System, prepared by Oak Ridge National Laboratory, ORNL/TM-2007/190, Jan. 2008.

(Continued)

*Primary Examiner* — Shawki S Ismail
*Assistant Examiner* — Monica Mata
(74) *Attorney, Agent, or Firm* — Bell & Manning, LLC

(57) ABSTRACT

An electric machine includes a rotor, permanent magnets, a stator, and a stator winding wound about a plurality of teeth to form a number of stator magnetic poles. The rotor includes a rotor core and a plurality of walls that form openings in the rotor core. A permanent magnet is mounted in each of the openings formed in the rotor core. The plurality of permanent magnets are arranged to form a plurality of groups of permanent magnets that are equally circumferentially distributed around the rotor core with an interior polarity on a side of each permanent magnet facing other permanent magnets of the group of permanent magnets to which the permanent magnet is associated that is the same for all of the permanent magnets. Each permanent magnet is arranged to form a rotor pole, wherein a number of rotor poles is greater than the number of stator magnetic poles.

20 Claims, 8 Drawing Sheets

(56) References Cited

U.S. PATENT DOCUMENTS

| | | | |
|---|---|---|---|
| 9,537,361 B2 | 1/2017 | Hisada | |
| 2010/0117475 A1 | 5/2010 | Leonardi et al. | |
| 2013/0285500 A1 | 10/2013 | Kinashi | |
| 2014/0319942 A1* | 10/2014 | Nakayama | H02K 15/0435 |
| | | | 310/71 |
| 2015/0001970 A1 | 1/2015 | Zhang et al. | |
| 2015/0069879 A1 | 3/2015 | Papini et al. | |
| 2015/0171684 A1* | 6/2015 | McClelland | H02K 1/2746 |
| | | | 310/156.07 |
| 2017/0063187 A1* | 3/2017 | Hao | H02K 1/2766 |
| 2017/0063188 A1 | 3/2017 | Lipo et al. | |

OTHER PUBLICATIONS

Zhao et al., Material-Efficient Permanent-Magnet Shape for Torque Pulsation Minimization in SPM Motors for Automotive Applications, IEEE Transactions on Industrial Electronics, vol. 61, No. 10, Jan. 21, 2014, pp. 5779-5787.

Shah et al., Modeling of Novel Permanent Magnet Pole Shape SPM Motor for Reducing Torque Pulsation, IEEE Transactions on Magnetics, vol. 48, No. 11, Nov. 2012, pp. 4626-4629.

Zhao et al., Novel Permanent Magnet Pole Shape for Reducing Cogging Torque and Generating Sinusoidal Back EMF in Surface-mounted PM Motors, The Korean Institute of Electrical Engineers, 7, 2013, pp. 721-722.

\* cited by examiner

VERNIER MACHINE WITH SHAPED PERMANENT MAGNET GROUPS

BACKGROUND

The Vernier machine (VM) is a type of synchronous reluctance machine where the rotor rotates relatively slowly, and only at a fraction of the angular velocity of the stator's rotating field. The torque is developed based on an interaction between stator current and magnetic flux contributed by rotor mounted permanent magnets. In VMs, the machine torque steps up as the rotor speed steps down, creating an electric gearing effect. This makes the VM an attractive topology for direct-drive applications. Direct-drives are ideal as they eliminate the need for gear boxes, which add system complexity and reduce reliability due to increased parts. One disadvantage of a Vernier permanent magnet machine (VPMM) is that it retains a low power factor because the permanent magnets added to the rotor create additional harmonic flux leakage in the air gap between the stator and the rotor.

SUMMARY

In an example embodiment, an electric machine is provided. The electric machine includes, but is not limited to, a rotor, a plurality of permanent magnets, a stator, and a stator winding. The stator includes, but is not limited to, a stator core and a plurality of teeth that extend outward from the stator core. A slot of a plurality of slots is positioned between a pair of the plurality of teeth. The stator winding is wound about the plurality of teeth to form a number of stator magnetic poles between a set of connectors.

The rotor includes, but is not limited to, a rotor core and a plurality of walls that form openings in the rotor core that are separated from each other by rotor core. The stator is mounted on a first side of the rotor separated by an air gap between a surface of the rotor core and a tooth of the plurality of teeth.

A permanent magnet is mounted in each of the openings formed in the rotor core. The plurality of permanent magnets are arranged to form a plurality of groups of permanent magnets that are equally circumferentially distributed around the rotor core. Each permanent magnet has an interior polarity and an exterior polarity, wherein the interior polarity has an opposite polarity relative to the exterior polarity. The interior polarity is on a side of each permanent magnet facing other permanent magnets of the group of permanent magnets to which the permanent magnet is associated. The interior polarity is the same for all of the permanent magnets.

The openings further include a first flux barrier formed by a first plurality of walls of each opening on a first side of each permanent magnet and a second flux barrier formed by a second plurality of walls of each opening on a second side of each permanent magnet, wherein the first side is opposite the second side. Each permanent magnet is arranged to form a rotor pole, wherein a number of rotor poles is greater than the number of stator magnetic poles.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

A Vernier permanent magnet (PM) machine (VPMM) is an electromechanical device wherein a number of rotor magnetic poles pairs is much greater than a number of stator winding magnetic pole pairs rather than equal to the number of stator winding magnetic pole pairs as in a conventional PM machine. Though the number of stator and rotor poles is unequal, the VPMM machine achieves smooth torque by synchronizing the space harmonics of the stator magnetomotive force (MMF) with the MMF of the rotor magnets modulated by the stator teeth.

The increase in torque over a conventional PM machine results because two components of torque are produced in a VPMM rather than one component as in a conventional PM machine. The first component is a synchronous reaction torque produced by the PMs and the fundamental component of the stator MMF in which the MMF rotates at synchronous speed defined by the pole pitch of the stator winding (synchronous speed is determined by the stator and rotor pole number combination). The second component is produced by a reluctance torque produced by the PMs and the fundamental slot harmonic component of MMF in which this MMF component rotates at a higher synchronous speed than that defined by the coil pitch of the stator winding (reluctance torque is produced by the stator MMF and rotor reluctance caused by rotor saliency, which rotate at the same speed as the rotor). As understood by a person of skill in the art, the VPMM may be used as a generator or as a motor. The VPMM functions similar to an electric gear in which rotor torque is produced at a different frequency from a rotating frequency of the rotor. Since the rotor flux is spatially modulated by a pulsating toothed stator permeance, the operating principle is analogous to frequency modulation in communication theory.

Figure 1:
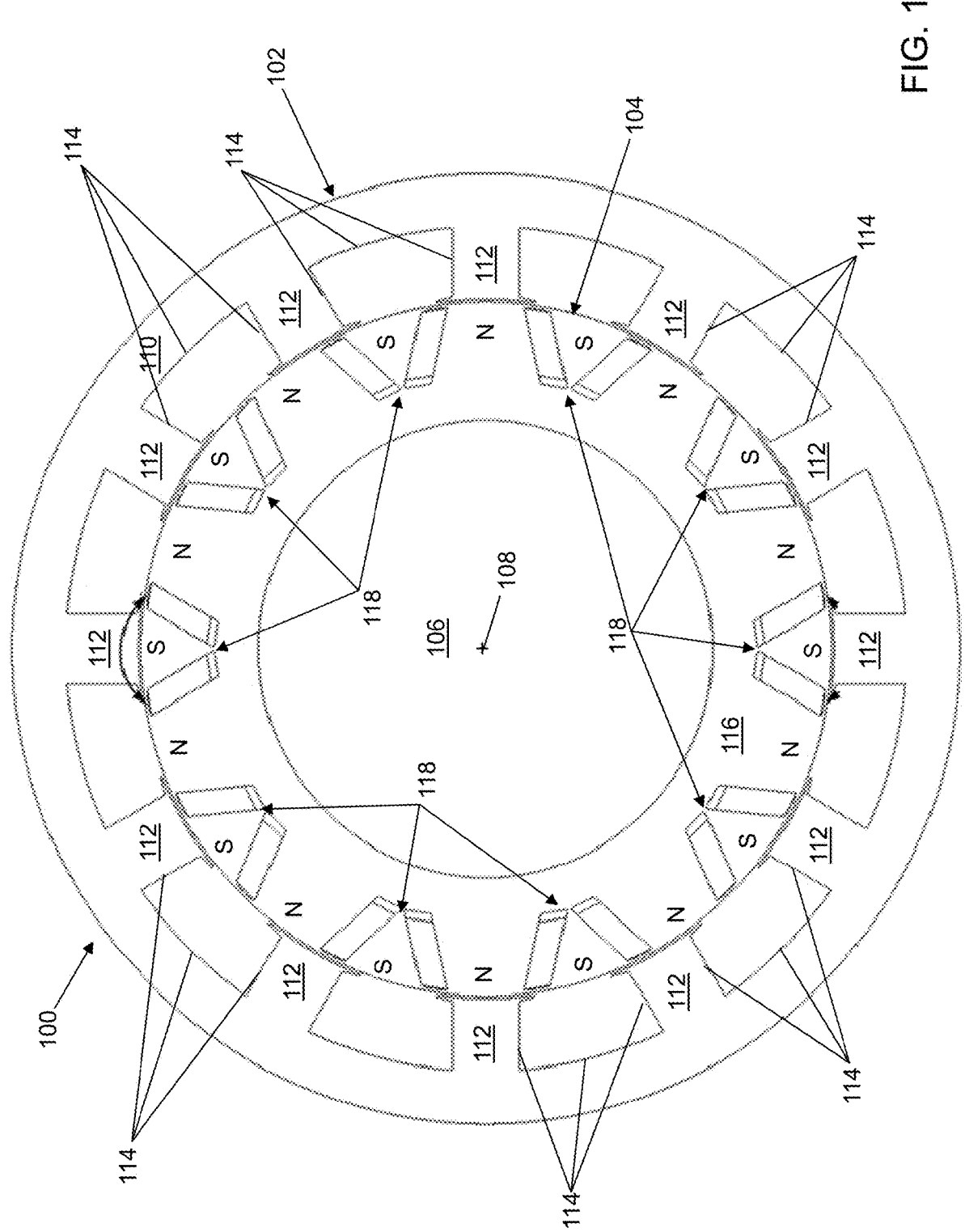
FIG. 1 depicts a radial type Vernier permanent magnet machine (VPMM) with a stator and a rotor positioned radially adjacent to each other in accordance with an illustrative embodiment with pairs of magnets that form a V-shape.

Referring to FIG. 1, a radial type VPMM 100 is shown in accordance with an illustrative embodiment. VPMM 100 may include a stator 102, a rotor 104, and a shaft 106 positioned radially adjacent to each other. In the illustrative embodiment of FIG. 1, rotor 104 is mounted to shaft 106 interior of stator 102 though stator 102 could be mounted interior of rotor 104. In alternative embodiments, radial type VPMM 100 could include a plurality of stators and/or a plurality of rotors mounted radially relative to each other in an alternating manner. Shaft 106, rotor 104, and stator 102 have generally circular cross sections as shown with reference to FIG. 1. Rotor 104 is mounted to shaft 106 for rotation with shaft 106. When VPMM 100 is operating as a motor, electrical energy provided to stator 102 rotates rotor 104 and thereby shaft 106. When VPMM 100 is operating as a generator, shaft 106 is rotated to generate electrical energy from VPMM 100.

As used in this disclosure, the term "mount" includes join, unite, connect, couple, associate, insert, hang, hold, affix, attach, fasten, bind, paste, secure, bolt, screw, rivet, solder, weld, glue, adhere, form over, layer, and other like terms. The phrases "mounted on" and "mounted to" include any interior or exterior portion of the element referenced. These phrases also encompass direct mounting (in which the referenced elements are in direct contact) and indirect mounting (in which the referenced elements are not in direct contact). Elements referenced as mounted to each other herein may further be integrally formed together, for example, using a molding process as understood by a person of skill in the art. As a result, elements described herein as being mounted to each other need not be discrete structural elements. The elements may be mounted permanently, removably, or releasably.

Use of directional terms, such as top, bottom, right, left, front, back, upper, lower, horizontal, vertical, behind, etc. are merely intended to facilitate reference to the various surfaces of the described structures relative to the orientations illustrated in the drawings and are not intended to be limiting in any manner unless otherwise indicated.

As used in this disclosure, the term "connect" includes join, unite, mount, couple, associate, insert, hang, hold, affix, attach, fasten, bind, paste, secure, bolt, screw, rivet, pin, nail, clasp, clamp, cement, fuse, solder, weld, glue, form over, slide together, layer, and other like terms. The phrases "connected on" and "connected to" include any interior or exterior portion of the element referenced. Elements referenced as connected to each other herein may further be integrally formed together. As a result, elements described herein as being connected to each other need not be discrete structural elements. The elements may be connected permanently, removably, or releasably.

Stator 102 may be formed of a ferromagnetic material such as iron, cobalt, nickel, etc. Stator 102 may include a stator core 110 and a plurality of teeth 112. In the illustrative embodiment, the plurality of teeth 112 extend from stator core 110 towards a center 108 of an interior of shaft 106. A plurality of slot walls 114 define walls of the stator slots. A slot is positioned between a pair of the plurality of teeth 112. In the illustrative embodiment, the plurality of teeth 112 of stator 102 includes 12 teeth that define 12 stator slots $N_S=N_T=12$, where $N_S$ is a number of stator slots and $N_T$ is a number of stator teeth of the plurality of teeth 112 of stator 102. As understood by a person of skill in the art, stator 102 may be formed of laminations mounted closely together in an axial direction and cut to define a shape and a size of stator core 110 and the plurality of teeth 112.

Figure 8:
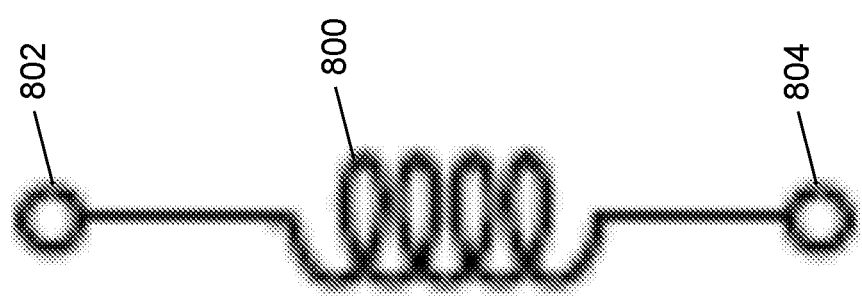
FIG. 8 depicts a stator winding of the VPMM of FIG. 1 in accordance with an illustrative embodiment.

Referring to FIG. 8, a stator winding 800 is shown between a first connector 802 and a second connector 804. Stator windings are wound around the plurality of teeth 112 and held within the plurality of stator slots. The stator windings carry a current between a plurality of connectors that may be provided to have one or more phases. In the illustrative embodiment, VPMM 100 is a three-phase machine, $N_{ph}=3$, with windings that are connected to provide three-phases. The windings are wound about the plurality of teeth 112 using various techniques to form a number of magnetic poles $N_{SMP}$ between a set of connectors, such as first connector 802 and second connector 804, that may be associated with each phase depending on the winding technique. In an illustrative embodiment, the windings are concentrated windings such that $N_S$ is defined by a number of stator magnetic poles $N_{SMP}$, where $N_S=N_{ph}N_{SMP}$. In the illustrative embodiment of FIG. 1, VPMM 100 is wound to form four stator magnetic poles $N_{SMP}=N_S M_{ph}=12/3=4$.

Rotor 104 may be formed of a ferromagnetic material such as iron, cobalt, nickel, etc. Rotor 104 may include a rotor core 116 and a plurality of permanent magnet pairs 118 mounted within rotor core 116. As understood by a person of skill in the art, rotor core 116 may be formed of laminations mounted closely together in the axial direction. The permanent magnets of the plurality of permanent magnet pairs 108 are electrically isolated from each other. Openings are formed in rotor core 116 that are sized and shaped to hold the plurality of permanent magnet pairs 118.

Each permanent magnet of each pair of the plurality of permanent magnet pairs 118 is magnetized to form a south pole "S" (indicated with "S" in the figures) on a first side and a north pole "N" (indicated with "N" in the figures) on a second side opposite the first side in a rotational direction of rotor 104. The plurality of permanent magnet pairs 118 are mounted with N poles facing N poles and S poles facing S poles to form pole pairs. As indicated referring to FIG. 1, the magnets within each pair of the plurality of permanent magnet pairs 118 is magnetized with S poles facing each other. N poles of each pair of the plurality of permanent magnet pairs 118 face an adjacent pair of the plurality of permanent magnet pairs 118. As a result, an interior polarity (e.g., S or N) of each permanent magnet of each pair of the plurality of permanent magnet pairs 118 is the same, while an exterior polarity (e.g., N or S) of each permanent magnet of each pair of the plurality of permanent magnet pairs 118 is the opposite. In the illustrative embodiment of FIG. 1, VPMM 100 includes ten permanent magnet pole pairs 118 $N_{pp}$ defined using twenty permanent magnets $N_{pm}$. Each permanent magnet of the plurality of permanent magnet pairs 118 forms a rotor pole such that $N_p=N_{pm}$, where $N_p$ is a number of rotor poles formed by the permanent magnets.

VPMM 100 may be formed using a different number of rotor poles $N_p$, a different number of stator magnetic poles $N_{SMP}$, and a different number of phases $N_{ph}$ as long as a Vernier machine is formed such that $N_p \gg N_{SMP}$. For illustration, $N_p=2N_S \pm N_{SMP}$ can be selected.

Figure 2:
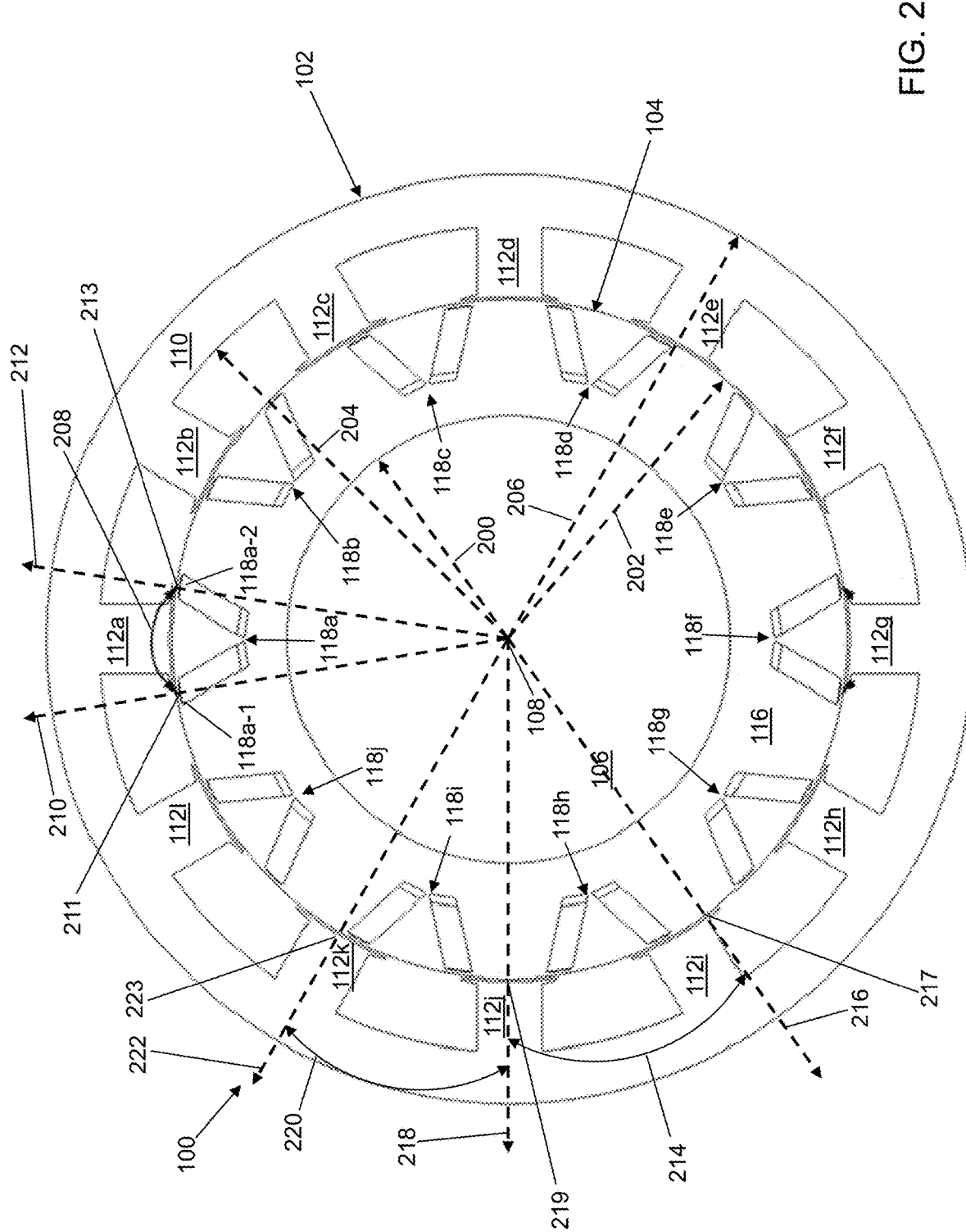
FIG. 2 depicts the VPMM of FIG. 1 illustrating various physical characteristics in accordance with an illustrative embodiment.

Referring to FIG. 2, various physical characteristics of VPMM 100 are shown in accordance with an illustrative embodiment. In the illustrative embodiment, stator 102 includes a first tooth 112a, a second tooth 112b, a third tooth 112c, a fourth tooth 112d, a fifth tooth 112e, a sixth tooth 112f, a seventh tooth 112g, an eighth tooth 112h, a ninth tooth 112i, a tenth tooth 112j, an eleventh tooth 112k, and a twelfth tooth 112l with associated stator slots formed between adjacent teeth. In the illustrative embodiment, rotor 104 includes a first pair of permanent magnets 118a, a second pair of permanent magnets 118b, a third pair of permanent magnets 118c, a fourth pair of permanent magnets 118d, a fifth pair of permanent magnets 118e, a sixth pair of permanent magnets 118f, a seventh pair of permanent magnets 118g, an eighth pair of permanent magnets 118h, a ninth pair of permanent magnets 118i, and a tenth pair of permanent magnets 118j. For illustration, the first pair of permanent magnets 118a includes a first permanent magnet 118a-1 and a second permanent magnet 118a-2 that form a first pole pair having a V-shape that is open towards stator 102.

Each permanent magnet of the plurality of permanent magnet pairs 118 may be identical (though mounted with an opposing magnetization direction for adjacent magnets to form the pole pairs) and may be formed of rare earth magnets, such as neodymium and dysprosium, of ferrite based magnets, etc. though rare earth magnets are preferred. In the illustrative embodiment of FIGS. 1 and 2, each permanent magnet of the plurality of permanent magnet pairs 118 is rectangular elongated in a radial direction extending from center 108 towards rotor 104.

Each pole pair formed by each pair of the plurality of permanent magnet pairs 118 also may be identical and formed at a regular pitch circumferentially around rotor 104. The relative position between rotor 104 and stator 102 changes continuously during use of VPMM 100 because rotor 104 mounts to shaft 106 for rotation as understood by a person of skill in the art. FIGS. 1 and 2 merely show a snapshot in time.

A shaft radius 200 represents a radius $R_{sh}$ of shaft 106 measured from center 108. An outer rotor radius 202 represents a radius $R_r$ of rotor 104 measured from center 108. An inner stator core radius 204 represents a radius $R_{ist}$ of stator 102 measured from center 108. An outer stator core radius 206 represents a radius $R_{ost}$ of stator 102 measured from center 108. $L_r=R_r-R_{sh}$ is a radial length of rotor core 116. $L_{SC}=R_{ost}-R_{ist}$ is a radial length of stator core 110. Though not shown, it is understood by a person of skill in the art that stator 102 and rotor 104 extend respective axial lengths in a perpendicular direction relative to the views shown in FIGS. 1 and 2 and that the stator windings are further wound about the plurality of teeth 112 in the axial direction.

A rotor pole pitch angle 208 represents an angle $\tau_{rp}$ between a first axis 210 and a second axis 212. First axis 210 extends from center axis 108 through a first magnet center 211 of first permanent magnet 118a-1 of the first pair of permanent magnets 118a. First magnet center 211 of first permanent magnet 118a-1 is positioned at a center of a wall of first permanent magnet 118a-1 closest to stator 102. Second axis 212 extends from center axis 108 through a second magnet center 213 of second permanent magnet 118a-2 of the first pair of permanent magnets 118a. Second magnet center 213 of second permanent magnet 118a-2 is positioned at a center of a wall of second permanent magnet 118a-2 closest to stator 102.

A rotor pole pair pitch angle 214 represents an angle $\tau_{rpp}$ between a third axis 216 and a fourth axis 218. Third axis 216 extends from center axis 108 through a first pole edge 217 that is centered between the seventh pair of permanent magnets 118g and the eighth pair of permanent magnets 118h, where the seventh pair of permanent magnets 118g and the eighth pair of permanent magnets 118h are adjacent pole pairs. Fourth axis 218 extends from center axis 108 through a second pole edge 219 that is centered between the eighth pair of permanent magnets 118h and the ninth pair of permanent magnets 118i, where the eighth pair of permanent magnets 118h and the ninth pair of permanent magnets 118i are adjacent pole pairs. Because each pole pair is formed at a regular pitch circumferentially around rotor 104, $\tau_{rpp}=360/N_{pp}=360/(N_{pm}/2)$ or 36 degrees in the illustrative embodiment.

A stator tooth angle 220 represents an angle $\tau_S$ between fourth axis 218 and a fifth axis 222. In the illustrative embodiment, when rotor 104 is rotated in alignment relative to stator 102 as shown in FIGS. 1 and 2, fourth axis 218 also extends from center axis 108 through a tooth center of tenth tooth 112j. Fifth axis 222 extends through a tooth center of eleventh tooth 112k, where tenth tooth 112j and eleventh tooth 112k are adjacent teeth of the plurality of teeth 112. Because each stator slot and therefore each stator tooth is formed at a regular pitch circumferentially around stator 102, $\tau_S=360/N_T$ or 30 degrees in the illustrative embodiment.

Figure 3:
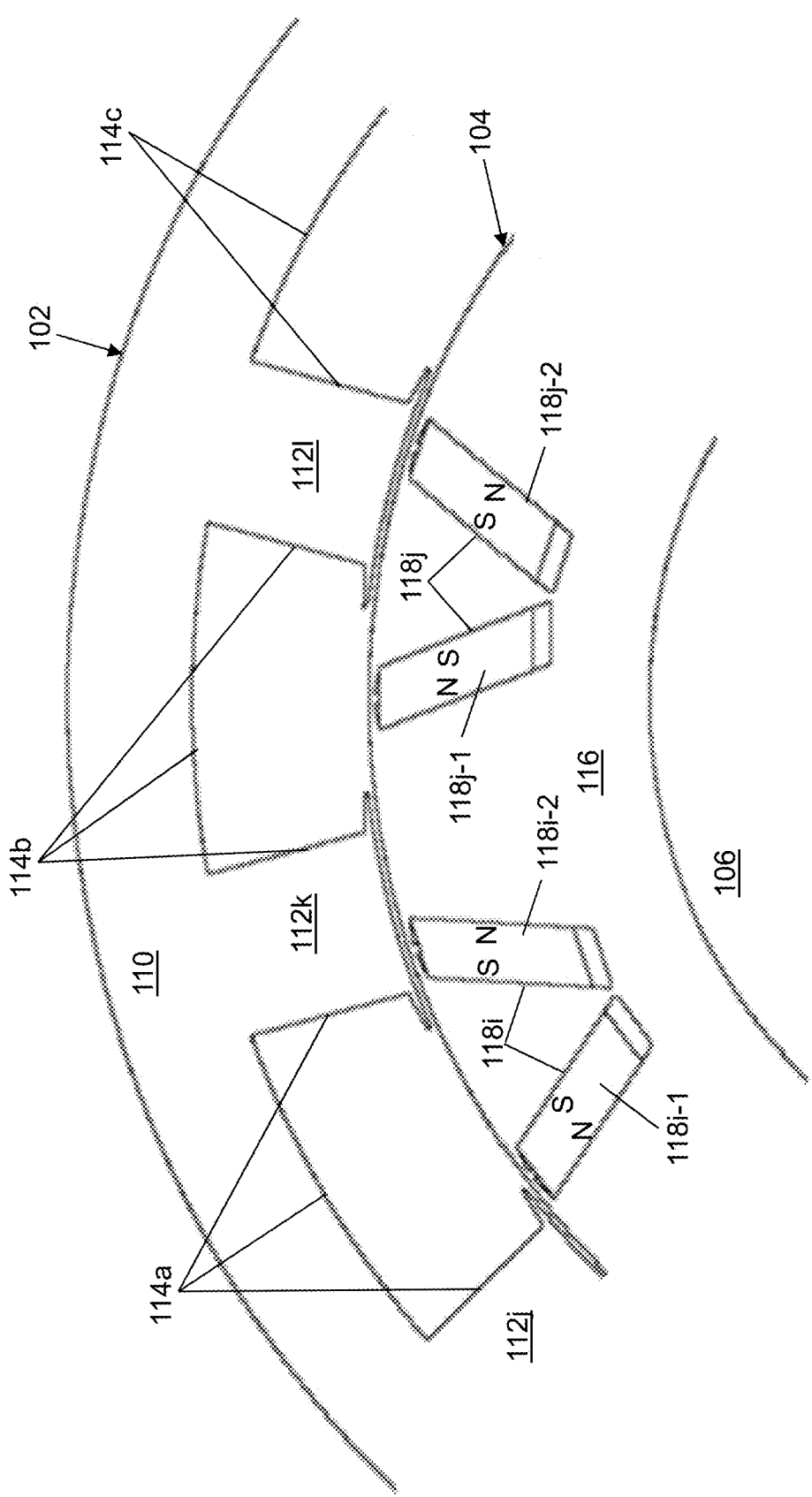
FIG. 3 depicts a zoomed portion of the VPMM of FIG. 1 in accordance with an illustrative embodiment.

For further illustration, referring to FIG. 3, the ninth pair of permanent magnets 118i includes a first permanent magnet 118i-1 and a second permanent magnet 118i-2 that form a ninth pole pair with S poles facing each other and N poles facing the tenth pair of permanent magnets 118j on a right side and the eighth pair of permanent magnets 118h (shown referring to FIG. 2) on a left side. The tenth pair of permanent magnets 118j includes a first permanent magnet 118j-1 and a second permanent magnet 118j-2 that form a tenth pole pair with S poles facing each other and N poles facing the ninth pair of permanent magnets 118i on a left side and the first pair of permanent magnets 118a (shown referring to FIG. 2) on a right side.

For illustration, first slot walls 114a define walls of a first slot formed between tenth tooth 112j, stator core 110, and eleventh tooth 112k in which windings are wound about the plurality of teeth 112 of stator 102 as discussed previously. Second slot walls 114b define walls of a second slot formed between eleventh tooth 112k, stator core 110, and twelfth tooth 112l in which windings are wound. Third slot walls 114c (only three are visible in FIG. 3) define walls of a third slot formed between twelfth tooth 112l, stator core 110, and first tooth 112a (shown referring to FIG. 2) in which windings are wound.

Figure 4:
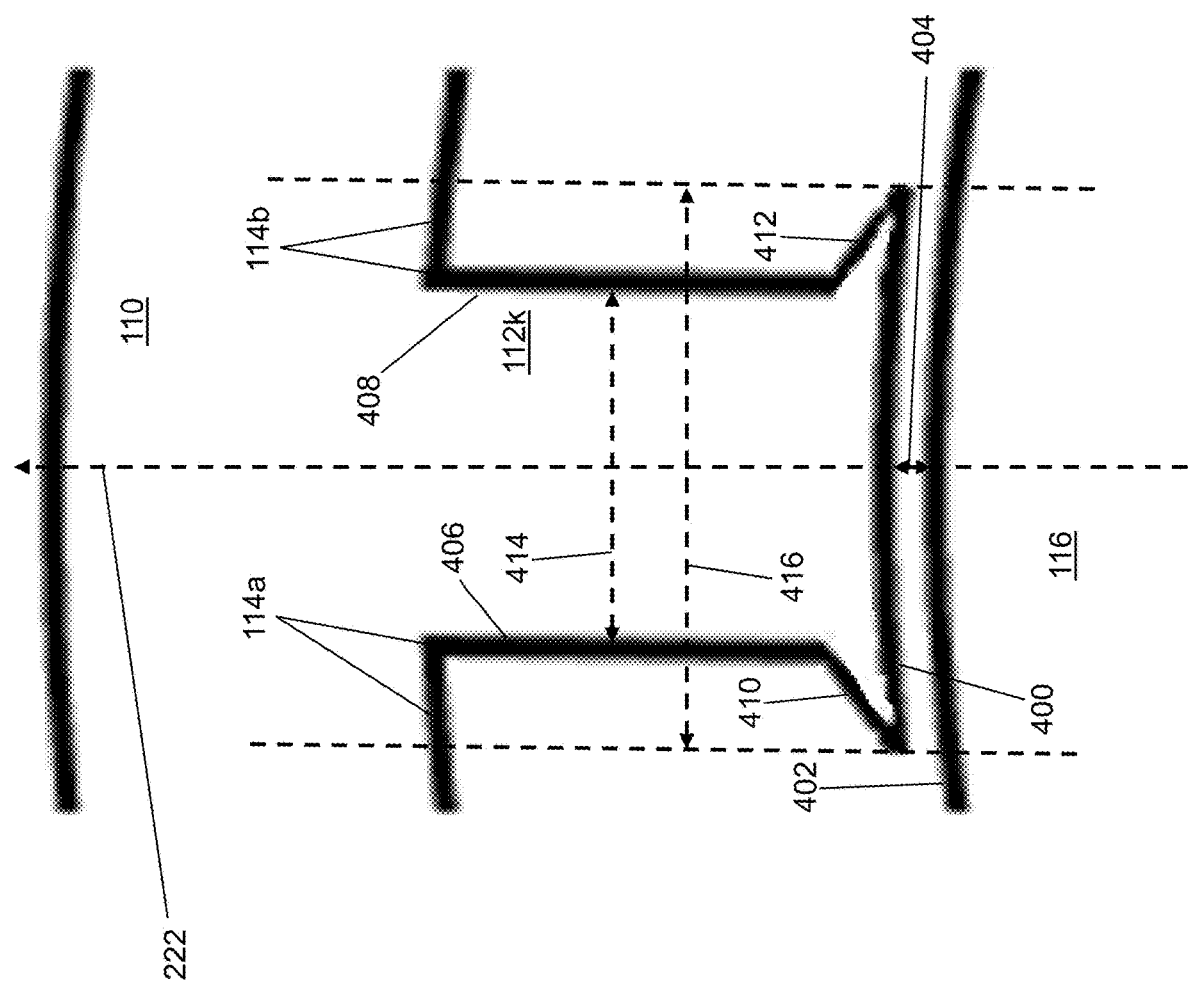
FIG. 4 depicts a second zoomed portion of the VPMM of FIG. 1 in accordance with an illustrative embodiment.

Referring to FIG. 4, a zoomed portion of VPMM 100 is shown in accordance with an illustrative embodiment to show a relationship between an interior tooth surface 400 of each stator tooth of the plurality of stator teeth 112 and an exterior surface 402 of rotor 104. The interior tooth surface 400 of each of the plurality of teeth 112 of stator 102 is separated from exterior surface 402 of rotor 104 by an air gap. Stator 102 is mounted relative to rotor 104 such that they are separated by the air gap at a closest point of contact. An air gap length 404 represents a length $L_{ag}$ of the air gap measured between to interior tooth surface 400 of eleventh tooth 112k along fifth axis 222.

Eleventh tooth 112k shown in the illustrative embodiment of FIG. 4 has a left sidewall 406 that forms a wall of first slot walls 114a and a right sidewall 408 that forms a wall of second slot walls 114b. Eleventh tooth 112k can have various shapes. In the illustrative embodiment, eleventh tooth 112k also includes a left transition wall 410 and a right transition wall 412. Left transition wall 410 is formed between left sidewall 406 and interior tooth surface 400 and extends away from left sidewall 406 towards an interior of the first slot formed by first slot walls 114a. Right transition wall 412 is formed between right sidewall 408 and interior tooth surface 400 and extends away from right sidewall 408 towards an interior of the second slot formed by second slot walls 114b. A first tooth width 414 represents a width $W_{T1}$ of eleventh tooth 112k measured perpendicular to fifth axis 222 between left sidewall 406 and right sidewall 408. A second tooth width 416 represents a width $W_{T2}$ of eleventh tooth 112k measured perpendicular to fifth axis 222 between left transition sidewall 410 and right transition sidewall 412.

Figure 5:
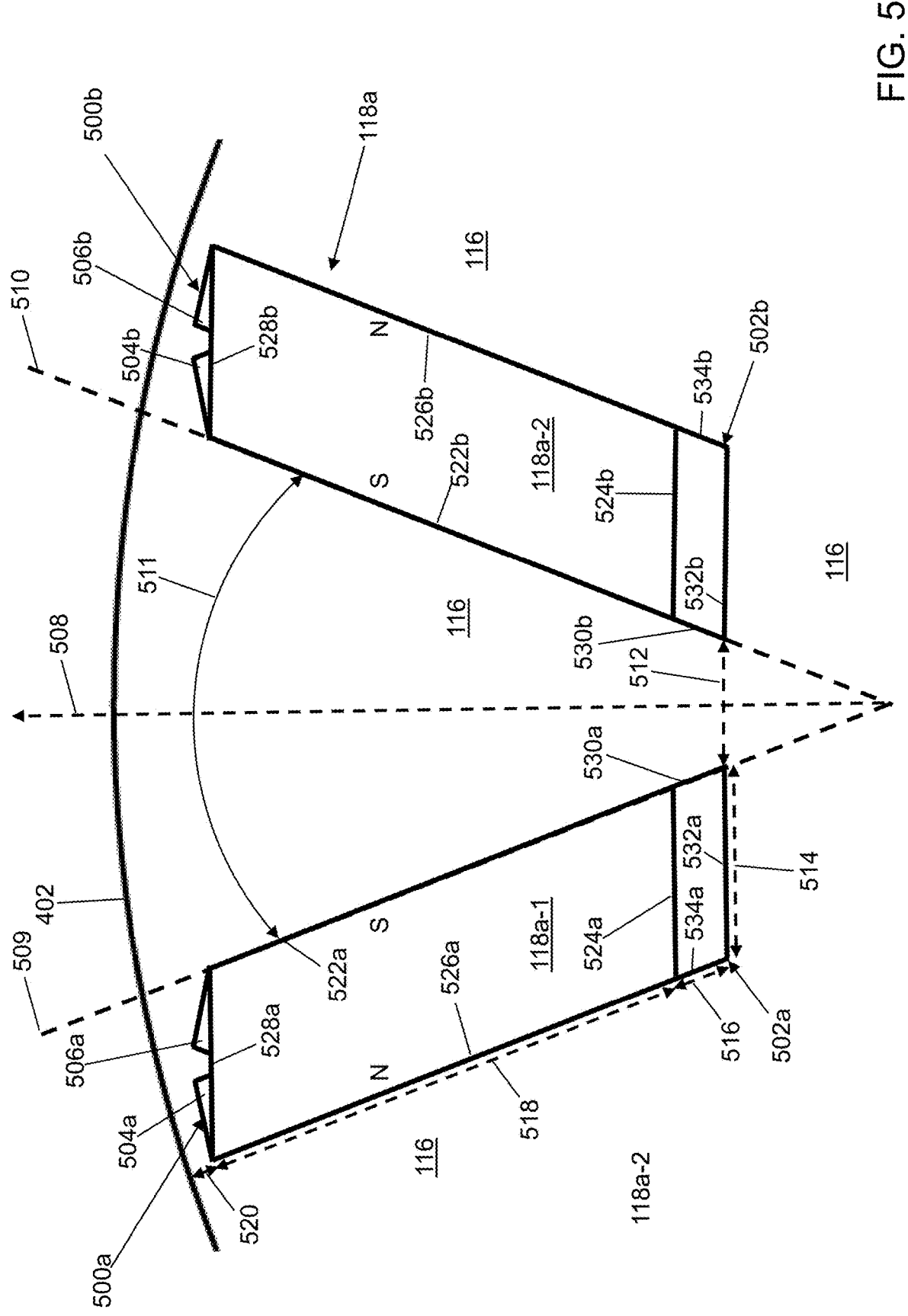
FIG. 5 depicts a second zoomed portion of a rotor of the VPMM of FIG. 1 in accordance with an illustrative embodiment.

Referring to FIG. 5, the first pair of permanent magnets 118a is shown in accordance with an illustrative embodiment. First permanent magnet 118a-1 is rectangular with a first interior wall 522a, a first lower wall 524a, a first exterior wall 526a, and a first upper wall 528a. Second permanent magnet 118a-2 is rectangular with a second interior wall 522b, a second lower wall 524b, a second exterior wall 526b, and a second upper wall 528b.

Again, each permanent magnet of the plurality of permanent magnet pairs 118a is mounted in an opening formed in rotor core 116 of rotor 104. The opening is sized and shaped such that the permanent magnet can be mounted within the opening between a lower flux barrier and a pair of upper flux barriers. The lower flux barrier and the pair of upper flux barriers may be filled with air or other material with a permeability approximately equal to air. For illustration, a first opening 500a within which first permanent magnet 118a-1 of the first pair of permanent magnets 118a is mounted includes a first lower flux barrier 502a, a first upper flux barrier 504a, a second upper flux barrier 506a, and the opening sized and shaped to accommodate first permanent magnet 118a-1. For further illustration, a second opening 500b within which second permanent magnet 118a-2 of the first pair of permanent magnets 118a is mounted includes a second lower flux barrier 502b, a third upper flux barrier 504b, a fourth upper flux barrier 506b, and the opening sized and shaped to accommodate second permanent magnet 118a-2.

A sixth axis 508 extends from center 108 (not shown) and bisects the first pair of permanent magnets 118a. Thus, sixth axis 508 extends midway between first permanent magnet 118a-1 and second permanent magnet 118a-2 measured perpendicular to sixth axis 508. Second permanent magnet 118a-2 is a mirror image of first permanent magnet 118a-1 relative to sixth axis 508.

A magnet pair angle 511 represents an angle $T_M$ between a seventh axis 509 and an eighth axis 510. Seventh axis 509 is parallel to first interior wall 522a of first permanent magnet 118a-1 that faces second interior wall 522b of second permanent magnet 118a-2. Eighth axis 510 is parallel to second interior wall 522b of second permanent magnet 118a-2 that faces first interior wall 522a of first permanent magnet 118a-1. Sixth axis 508 bisects magnet pair angle 511.

First lower flux barrier 502a is rectangular and defined by first lower wall 524a of first permanent magnet 118a-1, a first interior barrier wall 530a, a first lower barrier wall 532a, and a first exterior barrier wall 534a. Second lower flux barrier 502b is rectangular and defined by second lower wall 524b of second permanent magnet 118a-2, a second interior barrier wall 530b, a second lower barrier wall 532b, and a second exterior barrier wall 534b. A distance 512 represents a distance $D_B$ measured perpendicular to sixth axis 508 between a first corner and a second corner. The first corner is between first interior barrier wall 530a and first lower barrier wall 532a of first lower flux barrier 502a. The second corner is between second interior barrier wall 530b and second lower barrier wall 532b of second lower flux barrier 502b.

A magnet width 514 represents a width $W_m$ measured perpendicular to sixth axis 508 between first interior barrier wall 530a and first exterior barrier wall 534a and between first interior wall 522a and first exterior wall 526a. A lower barrier length 516 represent a length $L_B$ measured parallel to seventh axis 509 between first lower wall 524a and first lower barrier wall 532a. A magnet length 518 represent a length $L_M$ measured parallel to seventh axis 509 between first lower wall 524a and first upper wall 528a of first permanent magnet 118a-1. A mounting distance 520 represent a distance $D_M$ measured parallel to seventh axis 509 between exterior surface 402 of rotor 104 and a third corner formed by first upper wall 528a and first exterior wall 526a of first permanent magnet 118a-1. Like rotor 104 and stator 102, each permanent magnet of the plurality of permanent magnet pairs 118 has a depth (not shown) that extends in an axial direction perpendicular relative to the view shown in FIG. 5.

First upper flux barrier 504a, second upper flux barrier 506a, third upper flux barrier 504b, and fourth upper flux barrier 506b are triangular and approximately equal in size and with a similar shape. First upper flux barrier 504a is formed by first upper wall 528a of first permanent magnet 118a-1 and two walls that extend away from first upper wall 528a toward exterior surface 402 of rotor 104. Second upper flux barrier 506a is formed by first upper wall 528a of first permanent magnet 118a-1 and two walls that extend away from first upper wall 528a toward exterior surface 402 of rotor 104. Third upper flux barrier 504b is formed by second upper wall 528b of second permanent magnet 118a-2 and two walls that extend away from second upper wall 528b toward exterior surface 402 of rotor 104. Fourth upper flux barrier 506b is formed by second upper wall 528b of second permanent magnet 118a-2 and two walls that extend away from second upper wall 528b toward exterior surface 402 of rotor 104. Rotor core 116 fills a space between first upper flux barrier 504a and second upper flux barrier 506a and between third upper flux barrier 504b and fourth upper flux barrier 506b. Rotor core 116 further fills a space between each of first upper flux barrier 504a, second upper flux barrier 506a, third upper flux barrier 504b, and fourth upper flux barrier 506b and exterior surface 402 of rotor 104.

Given a selected outer stator core radius 206 $R_{ost}$, the other dimensions of VPMM 100 can be defined. Outer rotor radius 202 $R_r$ is selected to have a value between ~10% and ~95% of $R_{ost}$. The radial length of rotor core 116 $L_r$ is selected to have a value between ~5% and ~95% of $R_{ost}$. Magnet length 518 $L_M$ is selected to have a value between ~0.1% and 100% of $L_r$. Magnet width 514 $W_m$ is selected to have a value between ~0.1 and ~50 times air gap length 404 $L_{ag}$. Rotor pole pitch angle 208 $\tau_{rp}$ is selected to have a value between ~25% and ~75% of rotor pole pair pitch angle 210 $\tau_{rpp}$ that is determined based on $N_{pp}$. Distance 512 $D_B$ is selected to have a value between ~0.1% and ~25% of magnet width 514 $W_m$. Lower barrier length 516 $L_B$ is selected to have a value between ~0.1% and ~50% of magnet length 518 $L_M$.

Figure 6:
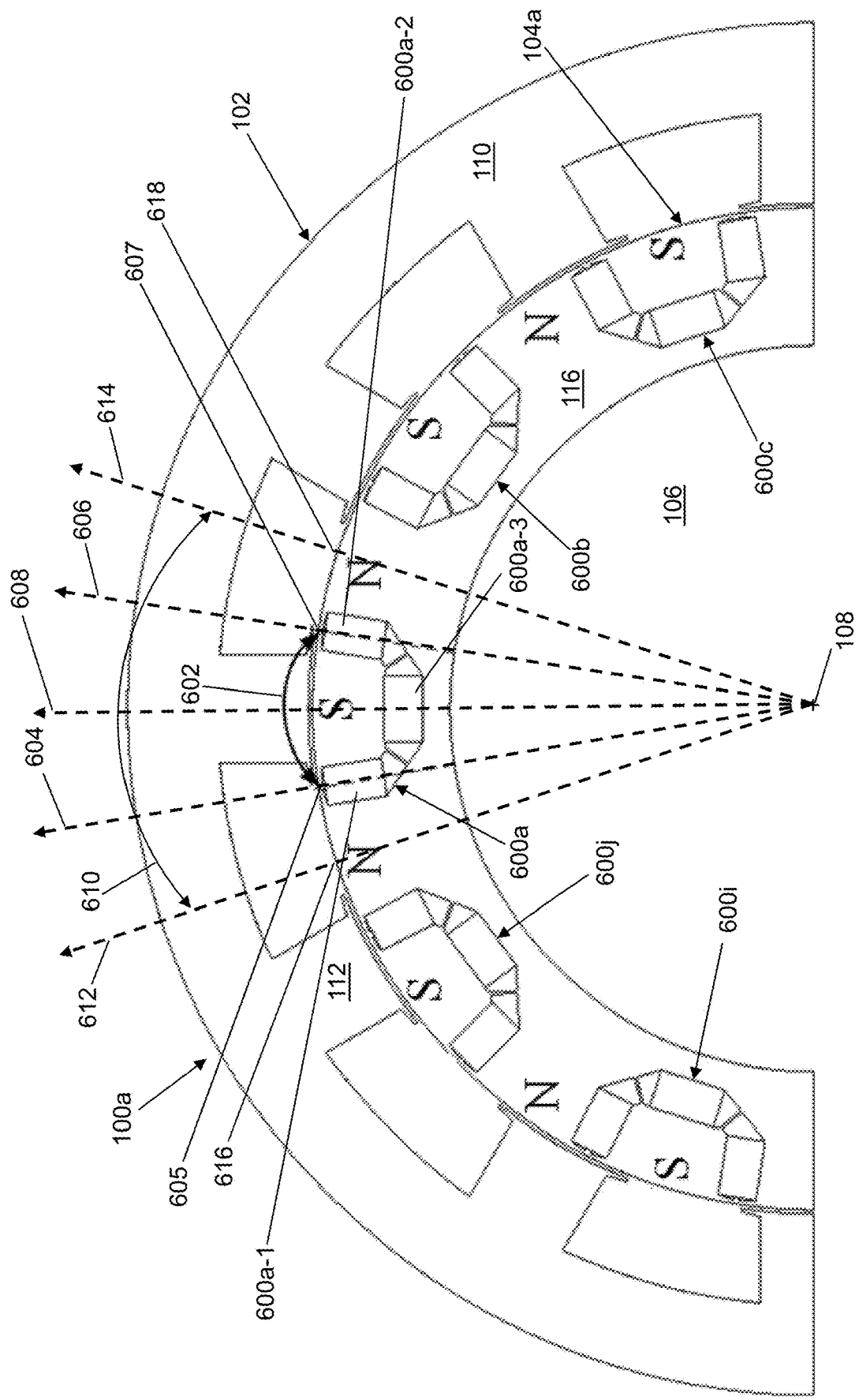
FIG. 6 depicts a radial type Vernier permanent magnet machine (VPMM) with a stator and a rotor positioned radially adjacent to each other in accordance with an illustrative embodiment with a group of magnets that form a U-shape.

Referring to FIG. 6, a second radial type VPMM 600 is shown in accordance with an illustrative embodiment. Only an upper half of second radial type VPMM 600 is shown for simplicity. Second radial type VPMM 600 may include stator 102, a second rotor 104a, and shaft 106 positioned radially adjacent to each other. Second rotor 104a is mounted to shaft 106 for rotation with shaft 106.

Second rotor 104a is similar to rotor 104 except that each pair of the plurality of permanent magnet pairs 118 is replaced with a group of permanent magnets that are arranged to have a U-shape relative to center axis 108 instead of a V-shape. In the illustrative embodiment, rotor 104 includes a first group of permanent magnets 600a, a second group of permanent magnets 600b, a third group of permanent magnets 600c, a fourth group of permanent magnets (not shown), a fifth group of permanent magnets (not shown), a sixth group of permanent magnets (not shown), a seventh group of permanent magnets (not shown), an eighth group of permanent magnets (not shown), a ninth group of permanent magnets 600i, and a tenth group of permanent magnets 600j. For illustration, the first group of permanent magnets 600a includes a first permanent magnet 600a-1, a second permanent magnet 600a-2, and a third permanent magnet 600a-3 that form a first pole group having a U-shape relative center axis 108.

Each permanent magnet of each group of a plurality of groups of permanent magnets 600 is magnetized to form a south pole "S" on a first side and a north pole "N" on a second side opposite the first side. The plurality of groups of permanent magnets 600 are mounted with N poles facing N poles and S poles facing S poles to form pole groups as further described referring to FIG. 7. As indicated referring to FIG. 6, the magnets within each group of the plurality of groups of permanent magnets 600 is magnetized with S poles facing each other. N poles of each group of the plurality of groups of permanent magnets 600 face an adjacent group of the plurality of groups of permanent magnets 600. In the illustrative embodiment of FIG. 1, VPMM 100 includes ten permanent magnet pole groups 600 $N_{pG}$ defined using thirty permanent magnets $N_{pm}$. Second VPMM 600 may be formed using a different number of rotor poles $N_p$, a different number of stator magnetic poles $N_{SMP}$, and a different number of phases $N_{ph}$ as long as a Vernier machine is formed such that $N_p \gg N_{SMP}$. Each permanent magnet of the plurality of groups of permanent magnets 600 form a rotor pole such that $N_p = N_{pm}$, where $N_p$ is a number of rotor poles formed by the permanent magnets.

A rotor pole pitch angle 602 represents an angle $\tau_{rp}$ between a first axis 604 and a second axis 606. First axis 604 extends from center axis 108 through a first magnet center 605 of first permanent magnet 600a-1 of the first group of permanent magnets 600a. First magnet center 605 of first permanent magnet 600a-1 is positioned at a center of a wall of first permanent magnet 600a-1 closest to stator 102. Second axis 606 extends from center axis 108 through a second magnet center 607 of second permanent magnet 600a-2 of the first group of permanent magnets 600a. Second magnet center 607 of second permanent magnet 600a-2 is positioned at a center of a wall of second permanent magnet 600a-2 closest to stator 102.

A third axis 608 extends from center 108 and bisects the first group of permanent magnets 600a. Thus, third axis 608 extends midway between first permanent magnet 600a-1 and second permanent magnet 600a-2 measured perpendicular to third axis 608 and through a center of third permanent magnet 600a-3. Second permanent magnet 600a-2 is a mirror image of first permanent magnet 600a-1 relative to third axis 608.

A rotor pole pair pitch angle 610 represents an angle $\tau_{rpp}$ between a fourth axis 612 and a fifth axis 614. Fourth axis 612 extends from center axis 108 through a first pole edge 616 that is centered between the tenth group of permanent magnets 600j and the first group of permanent magnets 600a, where the tenth group of permanent magnets 600j and the first group of permanent magnets 600a are adjacent pole groups. Fifth axis 614 extends from center axis 108 through a second pole edge 618 that is centered between the first group of permanent magnets 600a and the second group of permanent magnets 600b, where the first group of permanent magnets 600a and the second group of permanent magnets 600b are adjacent pole groups. Because each pole group is formed at a regular pitch circumferentially around rotor 104, $\tau_{rpp} = 360/N_{pG} = 360/(N_{pm}/3)$ or 36 degrees in the illustrative embodiment. In an illustrative embodiment, rotor pole pitch angle 602 $\tau_{rp}$ is selected to have a value between ~0.1% and 100% of rotor pole pair pitch angle 610 $\tau_{rpp}$ that is determined based on $N_{pG}$.

Figure 7:
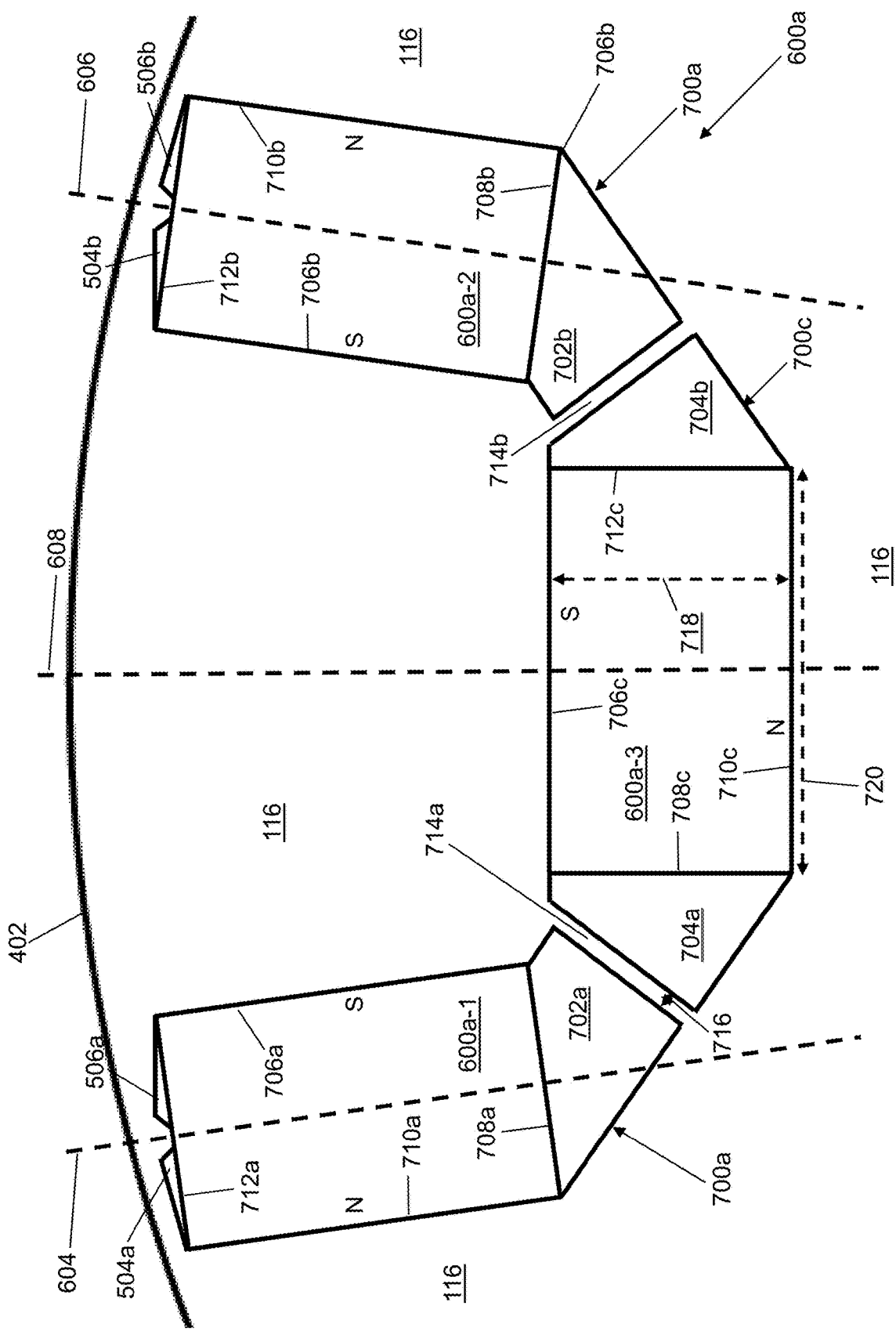
FIG. 7 depicts a second zoomed portion of a rotor of the VPMM of FIG. 6 in accordance with an illustrative embodiment.

Referring to FIG. 7, similar to each permanent magnet of the plurality of permanent magnet pairs 118a, each permanent magnet of the first group of permanent magnets 600a is mounted in an opening formed in rotor core 116 of second rotor 104a. First permanent magnet 600a-1 and second permanent magnet 600a-2 include a lower flux barrier and a pair of upper flux barriers similar to first permanent magnet 118a-1 and second permanent magnet 118a-2 though the lower flux barriers may have a different size and shape. For illustration, a first opening 700a within which first permanent magnet 600a-1 of the first group of permanent magnets 600a is mounted includes a first lower flux barrier 702a, first upper flux barrier 504a, second upper flux barrier 506a, and the opening sized and shaped to accommodate first permanent magnet 600a-1. For further illustration, a second opening 700b within which second permanent magnet 600a-2 of the second group of permanent magnets 600a is mounted includes a second lower flux barrier 702b, third upper flux barrier 504b, fourth upper flux barrier 506b, and the opening sized and shaped to accommodate second permanent magnet 600a-2.

Third permanent magnet 600a-3 includes a left flux barrier and a right flux barrier. For illustration, a third opening 700c within which third permanent magnet 600a-3 of the first group of permanent magnets 600a is mounted includes a left flux barrier 704a, a right flux barrier 704b, and the opening sized and shaped to accommodate third permanent magnet 600a-3. Third permanent magnet 600a-3 is positioned between first permanent magnet 600a-1 and second permanent magnet 600a-2 to form a base of the U-shape that is open towards stator 102.

First permanent magnet 600a-1 is rectangular with a first interior wall 706a, a first lower wall 708a, a first exterior wall 710a, and a first upper wall 712a. First interior wall 706a and first exterior wall 710a may be parallel to first axis 604. Second permanent magnet 600a-2 is rectangular with a second interior wall 706b, a second lower wall 708b, a second exterior wall 710b, and a second upper wall 712b. Second interior wall 706b and second exterior wall 710b may be parallel to second axis 606. First permanent magnet 600a-1 and second permanent magnet 600a-2 may be sized similar to first permanent magnet 118a-1 and second permanent magnet 118a-2.

Third permanent magnet 600a-3 is rectangular with a third interior wall 706c, a left wall 708c, a third exterior wall 710c, and a right wall 712c. Third interior wall 706c and third exterior wall 710c may be perpendicular to third axis 608. A magnet length 718 of third permanent magnet 600a-3 represents a length $L_{M3}$ measured parallel to third axis 608 between third interior wall 706c and third exterior wall 710c of first third permanent magnet 600a-3. A magnet width 720 of third permanent magnet 600a-3 represents a width $W_{m3}$ measured perpendicular to third axis 608 between left wall 708 and right wall 712c. Length $L_{M3}$ may be approximately equal to a magnet width of first permanent magnet 600a-1 measured perpendicular to first axis 604 between first interior wall 706a and first exterior wall 710a.

First lower flux barrier 702a and left flux barrier 704a are separated by a first gap 714a of rotor core 116. Second lower flux barrier 702b and right flux barrier 704b are similarly separated by a second gap 714b of rotor core 116. A gap width 716 represents a width $W_{FBG}$ measured across first gap 714a that is the same for second gap 714b.

The walls of first lower flux barrier 702a, left flux barrier 704a, second lower flux barrier 702b, and right flux barrier 704b may be curved in alternative embodiments.

The illustrative dimensions described above relative to rotor 104 and the plurality of permanent magnet pairs 118a may be determined in a similar manner given the selected outer stator core radius 206 $R_{ost}$. Magnet width 720 of third permanent magnet 600a-3 $W_{m3}$ is selected to have a value between ~0.1% and ~100% of rotor pole pitch angle 602 $\tau_{rp}$. Gap width 716 $W_{FBG}$ measured across first gap 714a and second gap 714b is selected to have a value between ~0.1% and ~25% of magnet width 720 of third permanent magnet 600a-3 $W_{m3}$.

A comparison between VPMM 100 and second VPMM 600 and a benchmark interior PM machine (IPMM) was performed. A performance comparison is tabulated in Table 1 below. Neodymium, iron and boron alloy rare earth PMs were used for each of IPMM, VPMM 100, and second VPMM 600.

TABLE 1

|  | IPMM | VPMM 100 | VPMM |
|---|---|---|---|
| $N_{SMP}/N_{pm}$ | 4/4 | 4/20 | 4/20 |
| $J_S$ [A/mm$^2$] | 4.6 | 4.6 | 4.6 |
| Excitation frequency [Hz] | 13.33 | 66.67 | 66.67 |
| PM mass/% total weight [kg] | 11.3/3.6% | 11.5/3.7% | 11.9/3.8% |
| Torque [Nm] | 534 | 912 | 946 |
| Torque density (over total volume) [Nm/L] | 17.3 | 29.4 | 30.5 |
| Power factor (lagging) | 0.8 | 0.83 | 0.83 |
| $R_{ost}$ [mm] | 355.6 | 355.6 | 355.6 |
| Stack length [mm] | 311 | 311 | 311 |

VPMM 100 and second VPMM 600 provide an ~80% torque improvement with a comparable power factor. VPMM 100 and second VPMM 600 include alternating rotor leakage flux blocking topologies, which enable use in low and medium speed applications as a motor or generator. An alternating flux barrier (e.g. first lower flux barrier 502a and second lower flux barrier 502b) is placed at bottom of each permanent magnet of the plurality of pairs of permanent magnets 118 on rotor 104.

Many industries require high torque, low speed motors/generators at the power level ranging from kilowatts to megawatts, which can be provided by VPMM 100 and second VPMM 600. VPMM 100 and second VPMM 600 can be used in a direct drive configuration, which helps reduce machine complexity and cost and improves reliability. VPMM 100 and second VPMM 600 are ideal for low speed, high torque applications such as wind turbines, industrial automation, and marine propulsion and for higher speeds, similar to conditions motors in the wheels of electric vehicles encounter.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. An electric machine comprising:
   a stator comprising
     a stator core; and
     a plurality of teeth that extend outward from the stator core, wherein a slot of a plurality of slots is positioned between a pair of the plurality of teeth;
   a stator winding wound about the plurality of teeth to form a number of stator magnetic poles between a set of connectors, wherein the number of stator magnetic poles is equal to a number of the plurality of teeth divided by a number of phases, wherein the number of phases is defined for a current provided to the stator winding when the electric machine is operated;
   a rotor comprising
     a rotor core; and
     a plurality of walls that form openings in the rotor core that are separated from each other by the rotor core; and
   a plurality of permanent magnets, wherein a permanent magnet is mounted in each of the openings formed in the rotor core, wherein the plurality of permanent magnets are arranged to form a plurality of pairs of permanent magnets that are equally circumferentially distributed around the rotor core, wherein each permanent magnet has an interior polarity and an exterior polarity, wherein the interior polarity has an opposite polarity relative to the exterior polarity, wherein the interior polarity is on a side of each permanent magnet facing other permanent magnets of the group of permanent magnets to which the permanent magnet is associated, wherein the interior polarity is the same for all of the permanent magnets;
   wherein the stator is mounted on a first side of the rotor separated by an air gap between a surface of the rotor core and a tooth of the plurality of teeth;
   wherein the openings further include a first flux barrier formed by a first plurality of walls of each opening on a first side of each permanent magnet that is closest to the stator, a second flux barrier formed by a second plurality of walls of each opening on the first side of each permanent magnet physically separated from the first flux barrier by the rotor core, and a third flux barrier formed by a third plurality of walls of each opening on a second side of each permanent magnet, wherein the first side is opposite the second side;
   wherein each permanent magnet is arranged to form a rotor pole,
   wherein a number of rotor poles is greater than the number of stator magnetic poles.

2. The electric machine of claim 1, wherein each pair of permanent magnets of the plurality of pairs of permanent magnets are arranged to form a V-shape open towards the plurality of teeth of the stator.

3. The electric machine of claim 1, wherein the third plurality of walls of each opening form three sides of a parallelogram, wherein a fourth side of the parallelogram is formed by a first face of a respective permanent magnet, wherein a first wall of the third plurality of walls is parallel to a second face of the respective permanent magnet, wherein a second wall of the third plurality of walls is parallel to a third face of the respective permanent magnet, wherein the first side is opposite the second side, wherein a third wall of the third plurality of walls connects between the first wall and the second wall and is parallel to the first face of the respective permanent magnet.

4. The electric machine of claim 1, wherein the first plurality of walls of each opening form two sides of a first triangle, wherein a third side of the first triangle is formed by a first portion of a first face of a respective permanent magnet, wherein the second plurality of walls of each opening form two sides of a second triangle, wherein a third side of the second triangle is formed by a second portion of the first face of the respective permanent magnet.

5. The electric machine of claim 1, wherein the number of rotor poles is selected as $N_p=2N_S \pm N_{SMP}$, where $N_p$ is the number of rotor poles, $N_S$ is the number of the plurality of teeth of the stator, and $N_{SMP}$ is the number of stator magnetic poles.

6. The electric machine of claim 5, wherein the number of rotor poles is twenty, the number of the plurality of teeth of the stator is twelve, and the number of stator magnetic poles is four.

7. The electric machine of claim 1, wherein a rotor pole pitch angle is defined between a first axis and a second axis, wherein the first axis extends radially outward from a radial center of the rotor core through a center of a first wall of a first permanent magnet of each pair of permanent magnets, wherein the first wall is a closest wall of the first permanent magnet to an exterior surface of the rotor core, wherein the second axis extends radially outward from the radial center of the rotor core through a center of a second wall of a second permanent magnet of each pair of permanent magnets, wherein the second wall is a closest wall of the second permanent magnet to the exterior surface of the rotor core, wherein the rotor pole pitch angle is between 25% and 75% of a rotor pole pair pitch angle $\tau_{rpp}$, where $\tau_{rpp}=360/N_{pG}$, where $N_{pG}$ is a number of the plurality of pairs of permanent magnets.

8. The electric machine of claim 1, wherein each pair of permanent magnets includes a first permanent magnet and a second permanent magnet, wherein the first permanent magnet is mounted in its opening to form a mirror image of the second permanent magnet relative to a first axis that extends radially outward from a radial center of the rotor core through a center of the pair of permanent magnets to which the first permanent magnet and the second permanent magnet are associated.

9. The electric machine of claim 3, wherein a minimum distance is defined between the third flux barrier of a first permanent magnet of each pair of permanent magnets and the third flux barrier of a second permanent magnet of each pair of permanent magnets, wherein the minimum distance is between 0.1% and 25% of a width of each permanent magnet.

10. The electric machine of claim 9, wherein a length of the first wall of the third flux barrier associated with each permanent magnet of the plurality of permanent magnets is between 0.1% and 50% of a length of the second face of each permanent magnet.

11. The electric machine of claim 1, wherein an outer radius of the rotor core is between 10% and 95% of an outer radius of the stator core.

12. The electric machine of claim 1, wherein a radial length of the rotor core is between 5% and 95% of an outer radius of the stator core.

13. The electric machine of claim 12, wherein a length of each permanent magnet is between 0.1% and 100% of the radial length of the rotor core.

14. The electric machine of claim 1, wherein a width of each permanent magnet is between 0.1 and 50 times a length of the air gap.

15. An electric machine comprising:
a stator comprising
a stator core; and
a plurality of teeth that extend outward from the stator core, wherein a slot of a plurality of slots is positioned between a pair of the plurality of teeth;
a stator winding wound about the plurality of teeth to form a number of stator magnetic poles between a set of connectors, wherein the number of stator magnetic poles is equal to a number of the plurality of teeth divided by a number of phases, wherein the number of phases is defined for a current provided to the stator winding when the electric machine is operated;
a rotor comprising
a rotor core; and
a plurality of walls that form a first plurality of openings and a second plurality of openings in the rotor core that are separated from each other by the rotor core; and
a plurality of permanent magnets, wherein a permanent magnet is mounted in each of the openings formed in the rotor core, wherein the plurality of permanent magnets are arranged to form a plurality of groups of permanent magnets that are equally circumferentially distributed around the rotor core, wherein each permanent magnet has an interior polarity and an exterior polarity, wherein the interior polarity has an opposite polarity relative to the exterior polarity, wherein the interior polarity is on a side of each permanent magnet facing other permanent magnets of the group of permanent magnets to which the permanent magnet is associated, wherein the interior polarity is the same for all of the permanent magnets, wherein each group of permanent magnets of the plurality of groups of permanent magnets includes a first permanent magnet, a second permanent magnet, and a third permanent magnet, wherein the third permanent magnet is between a respective first permanent magnet and a respective second permanent magnet to form a U-shape open towards the plurality of teeth of the stator;
wherein the stator is mounted on a first side of the rotor separated by an air gap between a surface of the rotor core and a tooth of the plurality of teeth;
wherein the first plurality of openings include a first flux barrier formed by a first plurality of walls of each respective opening of the first plurality of openings on a first side of each first permanent magnet and of each second permanent magnet that are closest to the stator, a second flux barrier formed by a second plurality of walls of each respective opening of the first plurality of openings on the first side of each first permanent magnet and on the first side of each second permanent magnet, and a third flux barrier formed by a third plurality of walls of each respective opening of the first plurality of openings on a second side of each first permanent magnet and of each second permanent magnet, wherein the first side is opposite the second side, wherein the first flux barrier of each first permanent magnet and of each second permanent magnet is physically separated from the respective second flux barrier by the rotor core, wherein the second plurality of openings include a fourth flux barrier formed by a fourth plurality of walls of each respective opening of the second plurality of openings on a first side of each third permanent magnet and a fifth flux barrier formed by a fifth plurality of walls of each respective opening of the second plurality of openings on a second side of each third permanent magnet, wherein the first side of each third permanent magnet is opposite the second side of each third permanent magnet;

wherein each permanent magnet is arranged to form a rotor pole, wherein a number of rotor poles is greater than twice the number of stator magnetic poles.

16. The electric machine of claim 15, wherein a minimum distance is defined between the third flux barrier of the first permanent magnet of each group of permanent magnets and the fourth flux barrier of the third permanent magnet of each group of permanent magnets, wherein the minimum distance is between 0.1% and 25% of a width of each permanent magnet.

17. The electric machine of claim 16, wherein the minimum distance is further defined between the third flux barrier of the second permanent magnet of each group of permanent magnets and the fifth flux barrier of the third permanent magnet of each group of permanent magnets.

18. The electric machine of claim 15, wherein the first plurality of walls and the second plurality of walls form two sides of a triangle, wherein a third side of the triangle is formed by a portion of a first face of a respective permanent magnet.

19. The electric machine of claim 15, wherein the number of rotor poles is selected as $N_p = 2N_S \pm N_{SMP}$, where $N_p$ is the number of rotor poles, $N_S$ is the number of the plurality of teeth of the stator, and $N_{SMP}$ is the number of stator magnetic poles.

20. The electric machine of claim 15, wherein the first permanent magnet of each group is mounted in its opening to form a mirror image of the second permanent magnet relative to a first axis that extends radially outward from a radial center of the rotor core through a center of the group of permanent magnets to which the first permanent magnet and the second permanent magnet are associated.

* * * * *